(12) United States Patent
Schick et al.

(10) Patent No.: US 6,502,877 B2
(45) Date of Patent: *Jan. 7, 2003

(54) GRIPPER SYSTEM, IN PARTICULAR VACUUM GRIPPER SYSTEM

(75) Inventors: Jens Schick, Herrenberg (DE); Kurt Schmalz, Dornstetten (DE); Wolfgang Schmalz, Dornstetten (DE); Thomas Eisele, Fluorn-Winzeln (DE)

(73) Assignee: J. Schmalz GmbH, Glatten (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/292,605

(22) Filed: Apr. 15, 1999

(65) Prior Publication Data

US 2001/0045755 A1 Nov. 29, 2001

(30) Foreign Application Priority Data

Apr. 18, 1998 (DE) .......................................... 198 17 426

(51) Int. Cl.[7] ............................. B25J 15/06; B25J 19/02
(52) U.S. Cl. ........................ 294/65; 294/64.1; 294/907; 901/40; 901/46
(58) Field of Search ............................... 294/64.1, 64.2, 294/65, 65.5, 81.2, 81.6, 86.4, 87.1, 119.1, 907; 414/737, 752; 901/31–33, 39, 40, 46

(56) References Cited

U.S. PATENT DOCUMENTS

| | | | | |
|---|---|---|---|---|
| 3,824,674 A | * | 7/1974 | Inoyama et al. | 294/907 X |
| 4,088,312 A | * | 5/1978 | Frosch et al. | 294/65 X |
| 4,266,905 A | * | 5/1981 | Birk et al. | 294/64.1 X |
| 4,460,208 A | * | 7/1984 | Hoffman | 294/65 |
| 4,505,636 A | * | 3/1985 | Sugino et al. | 294/87.1 X |
| 4,577,513 A | * | 3/1986 | Harwood et al. | 901/46 X |
| 4,621,331 A | * | 11/1986 | Iwata | 294/907 X |
| 4,657,470 A | * | 4/1987 | Clarke et al. | 294/64.1 X |
| 4,680,523 A | * | 7/1987 | Goumas et al. | 294/907 X |
| 4,772,170 A | * | 9/1988 | Oldfield | 294/907 X |
| 4,819,978 A | * | 4/1989 | Scheinman et al. | 294/907 X |
| 5,244,242 A | * | 9/1993 | Goedecke | 294/907 X |
| 5,308,132 A | * | 5/1994 | Kirby et al. | 294/907 X |
| 5,387,068 A | * | 2/1995 | Pearson | 294/65 X |
| 5,437,490 A | * | 8/1995 | Mimura et al. | 294/907 X |
| 5,609,377 A | * | 3/1997 | Tanaka | 294/907 X |
| 5,609,381 A | * | 3/1997 | Thom et al. | 294/907 X |
| 5,632,590 A | * | 5/1997 | Pearson et al. | 294/907 X |
| 5,746,567 A | * | 5/1998 | Herbermann et al. | 294/65 X |
| 5,984,623 A | * | 11/1999 | Smith et al. | 294/65 X |
| 5,988,718 A | * | 11/1999 | Sugimoto et al. | 294/65 |

FOREIGN PATENT DOCUMENTS

| | | | | |
|---|---|---|---|---|
| DE | 3332147 | * | 3/1985 | .................. 294/907 |
| DE | 2754436 C2 | | 4/1986 | |
| DE | 4209935 A1 | | 11/1992 | |
| GB | 2271346 | * | 4/1994 | .................. 294/907 |

* cited by examiner

Primary Examiner—Johnny D. Cherry
(74) Attorney, Agent, or Firm—Jones, Tullar & Cooper, P.C.

(57) ABSTRACT

The present invention relates to a gripper system which can be secured to a hand of a robot and has at least two mutually independent gripper elements; each gripper element is provided with at least one force sensor for ascertaining a force in a predetermined direction. With this gripper system, it is possible to grasp components more reliably.

8 Claims, 7 Drawing Sheets

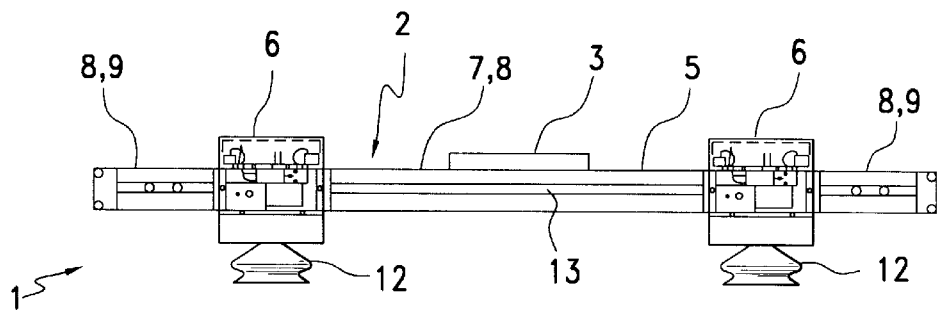
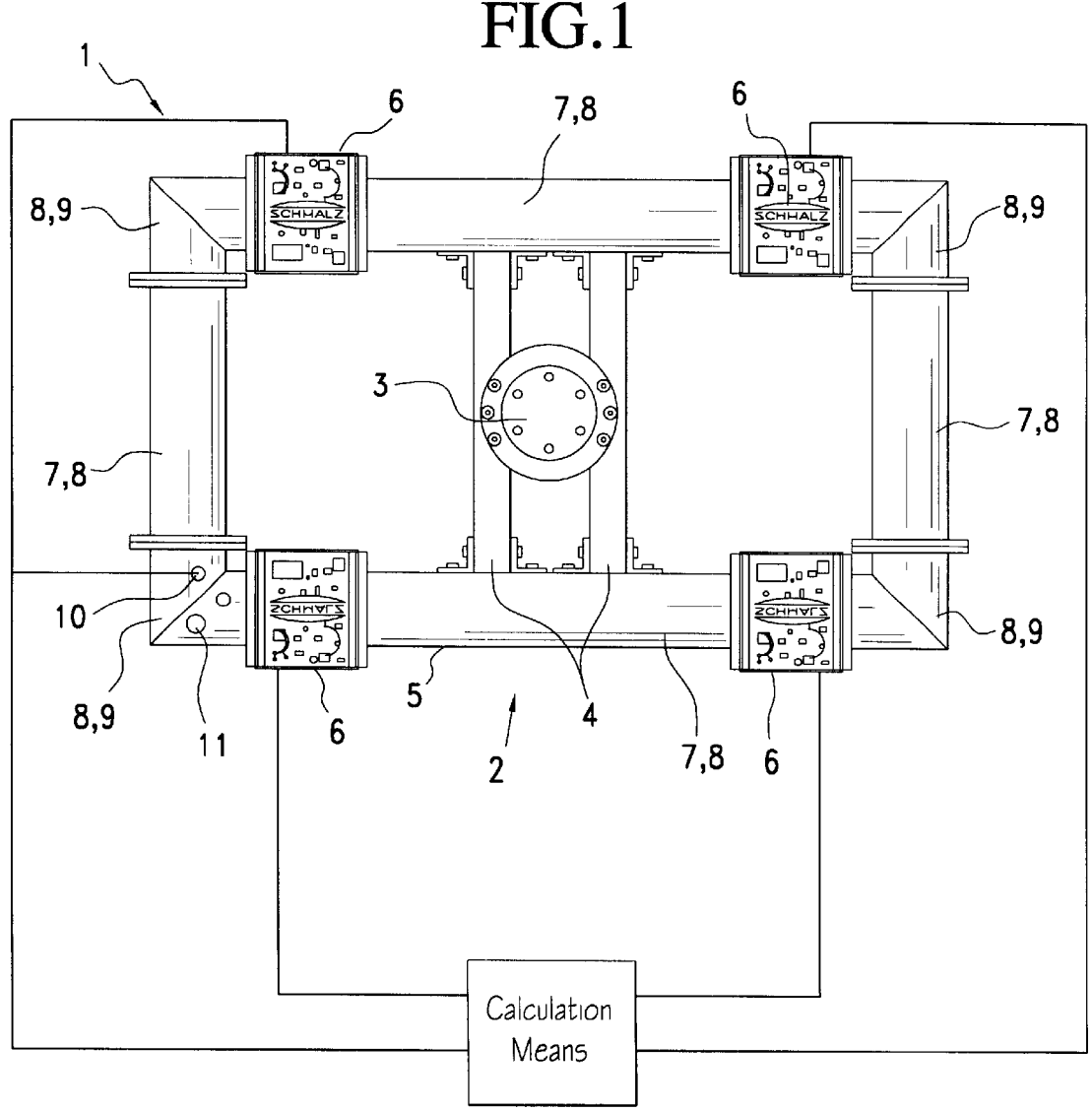

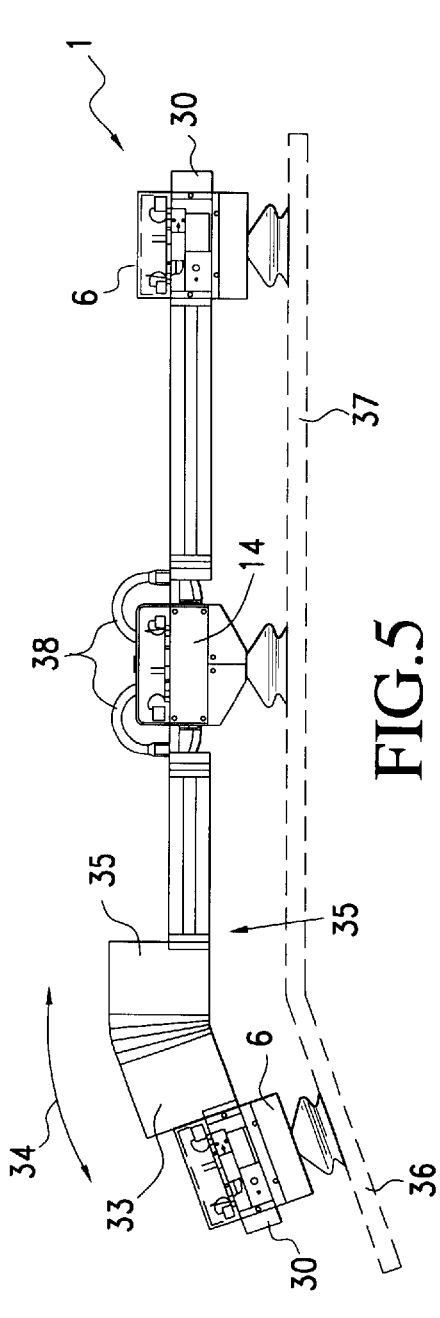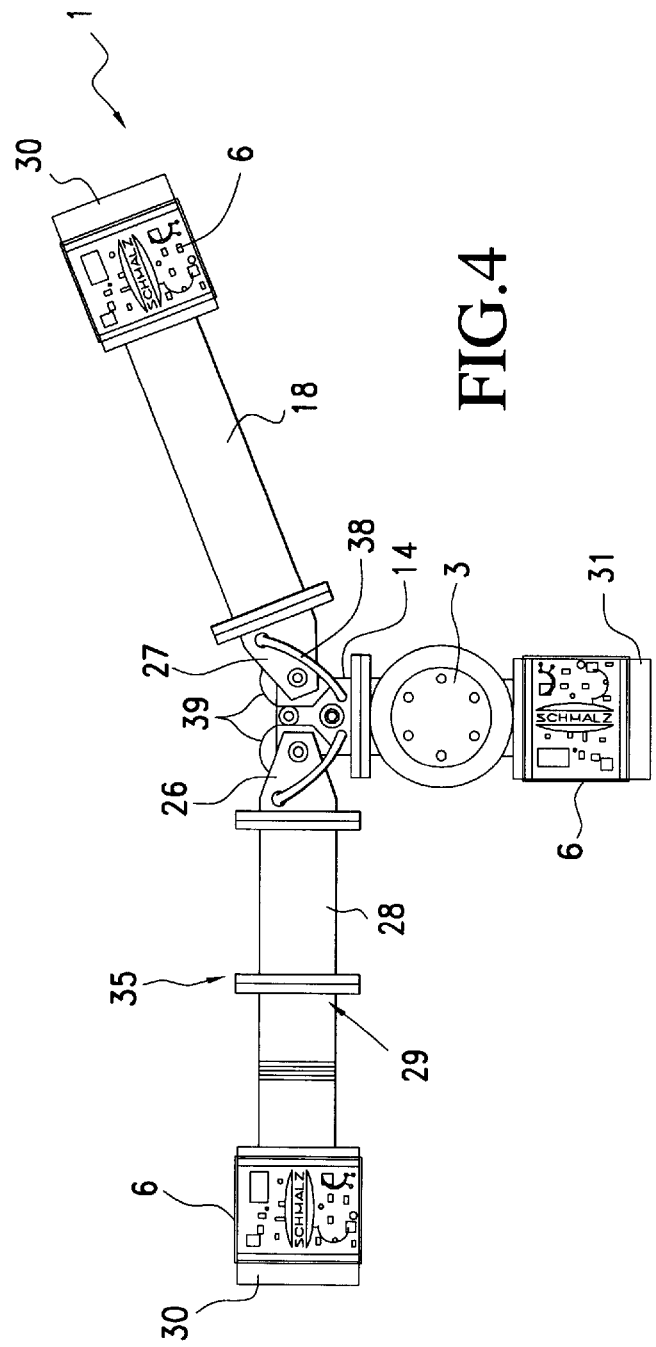

GRIPPER SYSTEM, IN PARTICULAR VACUUM GRIPPER SYSTEM

FIELD OF THE INVENTION

The invention relates to a gripper system having at least two mutually independent gripper elements, and to a vacuum gripper system having at least one independent gripper element.

BACKGROUND OF THE INVENTION

In handling workpieces, it is currently unavoidably necessary for the workpiece to have a defined outset position or a defined position in space, so that the workpiece can be grasped exactly with a gripper system that is secured to a robot hand. The permissible positional deviations are as a rule in the range of ±0.2 mm. Such exactly positioned workpieces can be grasped blind by a robot and can be handled and joined together blind. However, it has been found that large workpieces in particular, such as molded sheet-metal parts, while exactly positioned still cannot be grasped without error, for instance because they are warped or deformed. There is also the danger that because of its warping, a workpiece once grasped cannot be joined or can be joined only defectively. Such a handling system therefore requires permanent monitoring.

It also requires relatively expensive workpiece receptacles that assure that the workpieces will have a defined position of repose. Another problem is considered to be that if a gripper crashes, the gripper may become deformed. The gripper then moves onward, thus deformed, which can lead either to an inaccurate reception of the workpiece and/or an imprecise or defective joning operation.

SUMMARY OF THE INVENTION

It is therefore the object of the present invention to furnish a gripper system which requires less monitoring and with which even workpieces that are positioned outside the tolerance range can be grasped and nevertheless joined exactly.

This object is attained according to the patent invention with a gripper system which has at least two mutually independent gripper elements, and each gripper element is provided with at least one force sensor for ascertaining a force in a predetermined direction. This object is also attained according to the patent invention with a vacuum gripper system which has at least one independent gripper element that is provided with at least one force sensor for ascertaining a force in a predetermined direction.

In the first of these embodiments, the two mutually independent gripper elements enable secure grasping of the workpiece, and the quality of the gripping operation is ascertained via the force sensors. For instance, if a gripper element is located correctly on the workpiece or if this gripper element engages the workpiece in accordance with the specifications, then the value ascertained by the force sensor is also within the predetermined tolerance range. If the workpiece is incorrectly positioned, however, then the gripper element engages the workpiece out of line. As the workpiece is being lifted, the force sensor ascertains a value that is outside the tolerance range. The possibility now exists of putting down the workpiece and grasping it again, with the gripper system now shifted slightly, and in particular as a function of the force values ascertained by the force sensors. This can be done with recourse to the data stored in a data memory. From the forces ascertained, however, the positioning of the workpiece can also be calculated.

The gripper system can advantageously be secured to a robot hand. Another option is for the workpiece, despite being grasped wrong, to be transported onward, with the robot hand triggered via the values of the force sensors in such a way that the gripping error is compensated for, so that the workpiece is nevertheless joined exactly.

The gripper system according to the present invention has the substantial advantage that even workpieces that are outside the specified tolerance of ±0.2 mm can be grasped. In other words, this means that with the gripper system of the present invention a substantially greater positional tolerance for the workpieces can be specified; it can be in the range of ±2 cm, or in other words can be higher by a factor of 100.

Another advantage is considered to be that in handling the grasped workpiece, that is, in swiveling the workpiece that is grasped, the forces acting on the gripper elements, the force of gravity, and the dynamic mass or centrifugal forces in all the degrees of freedom, can be ascertained, and as a result the position of the workpiece at the gripper elements or in the gripper system can be determined. The robot hand or arm can also be braked, if the forces acting on the workpiece exceed limit values, and hence the workpiece will not come loose from the gripper elements. Because of the possibility of ascertaining dynamic mass forces or centrifugal forces, the possibility also exists of grasping a workpiece that has been positioned rotationally incorrectly, detecting the misrotated position, and correcting it. Both position error detection and rotary position detection are possible. The rotary position error can also be ascertained, in one embodiment, directly from the measured forces.

In order to grasp a beam, for instance, two gripper elements can be used, with which the force and the X position of the beam are ascertained. If three gripper elements are used, then both the introduced force at right angles to the X-Y direction and the X-Y position of the workpiece can be ascertained. If four gripper elements are used, the force of gravity, the X-Y position, and the position angle or in other words the rotary position of the workpiece can be ascertained.

The gripper system of the present invention furthermore has the substantial advantage that with it, different workpieces can be grasped, and that the gripper system can tell which workpieces have been grasped. If a gripper element is grasping empty air, for instance, or if its overall force deviates from the norm, then for instance it can be assigned to a particular component or workpiece.

In a further refinement, it is provided that the force sensor is disposed on the gripper element in such a way that with it, the force component acting in the receiving direction of the gripper element can be ascertained. As a result, in a simple way, the optimal contact of the gripper system with the workpiece to be grasped is ascertained. Via the ascertained force component in the receiving direction, the contact force of the gripper system on the workpiece can also be detected, so that the workpiece on being grasped is not damaged even if the workpiece is not in its intended position. It is furthermore possible in joining to monitor the requisite joining forces, that is, a controlled pressing of a front panel onto a passenger car body, or to monitor a force path, for instance in snap-in operations, and as a result integrated monitoring of successful joining is achieved.

An especially advantageous embodiment provides that the gripper elements are embodied as modules, and in particular as plug-in modules. Plug-in modules can be put together relatively simply and in a way secure against mistakes, so that the gripper system can be constructed quickly and without problems by putting the individual components together. Furthermore, modules have the particular advantage that because of their identical design they can be manufactured relatively inexpensively, and virtually any desired configuration can be created with them.

To make it possible to grasp large components or workpieces, the gripper elements are connected to one another via connecting components. The connecting components are either embodied rigidly, for instance as straight or curved connecting pieces, corner pieces or shunts. Furthermore, the components may have their own code for their shape and size. These connecting components make it possible to construct different structures, so that the gripper system can be optimally adapted to the shape of the workpiece. All the gripper elements, however, have identical connection hookups.

However, the connecting components can also be variable in their three-dimensional structure and can for instance be embodied as a two- or three-dimensional joint or as a telescoping piece, and in particular they are motor-driven. This has the substantial advantage that the gripper system is not rigid but instead is flexible, so that workpieces can be grasped not merely on a side but also all the way around; this may be advantageous for the sake of better handling, better joining, or the detection of the workpiece in the gripping operation. For instance, the gripper system can be moved to approach the workpiece until the first gripper element contacts the workpiece with the predetermined force. Then, by adjusting the flexible connecting components, the other gripper elements are made to approach the workpiece until they, too, contact the workpiece with the predetermined force. The workpiece can accordingly be grasped and held all the way around, in the same way as if it were grasped by a human hand. Furthermore, because of the flexibility of the gripper system, different workpieces can be grasped using a single structure, because the system can automatically adapt to the workpiece geometry, within a limited context. Preferably, the gripper system can be reproduced on an external screen, so that the instantaneous position or motion sequences can be monitored. Measuring the angle allows adaptive or controlled gripping. Adjusting the angle can be done manually or by motor and can be terminated for instance by a predetermined force, a predetermined negative pressure, a predetermined adjustment time, a predetermined angle, or by other sensors. The angle adjustment can also be done by electrochemical actuators or by rheological fluids.

To further increase the gripping capacity of the gripper system and to make the system more flexible, the gripper elements can be connected indirectly or directly to end plates or adapter plates. Other components, function elements, or tools, such as cameras, welding devices, and the like can also be secured to these plates. These additional components or tools can, however, also be secured to the connecting elements, for instance in clamping rails provided on the connecting elements.

To enable triggering the gripper elements and/or the active connecting components individually, these elements and components are connected to a bus system and have their own address. In this way, it is possible over a relatively low number of data lines, such as a CAN bus, to trigger the individual gripper elements or components. The only additional requirement is a power supply for the electronics and the mechanical drives of the various elements.

Advantageously, each gripper element is equipped with a negative pressure generator, such as an ejector. This has the substantial advantage that a central negative pressure system is not needed; instead, recourse can be had to the compressed-air system, which as a rule is present anyway. By measuring the negative pressure, particularly during gripping, it can be ascertained whether the gripper element has grasped the workpiece, and how well the workpiece has been grasped. It is also possible to regulate the vacuum.

Advantageously, each gripper element is connected to a central arithmetic and data storage unit, with which the gripper element communicates. This arithmetic and data storage unit triggers each gripper element and brings about the sequence of motion of the gripper system.

Preferably, each gripper element has its own microcontroller for computation tasks and a data memory. In this way, each gripper element can perform computation tasks, such as whether the particular gripper element is correctly contacting the workpiece (measurements of the negative pressure in the case of a suction cup), independently of the first numerical arithmetic unit. Depending on this, other suction elements or connecting components can for instance be triggered. The gripper elements can exchange data both with the central arithmetic unit and with one another and can make decisions.

In a preferred embodiment, the force sensor is a strain gauge. Via this force sensor, forces can be measured relatively simply and exactly. A piezoelectric element as the force sensor is also conceivable. Other sensors can operate on an inductive, pneumatic, magnetostrictive, or optical basis.

A simple design of the gripper system is attained in that all the elements and components can be plugged in, in particular via a plug and socket system. In this way, the individually needed gripper elements can be connected to the required connecting components by inserting them into one another in a way that precludes mistakes. Not only the supply lines, such as electric lines and compressed-air lines, but also the data lines and in particular the CAN bus (or some other bus) are extended all the way through each component. Termination of the individual lines is made possible via end plates, for instance.

Advantageously, the gripper elements have display elements, for instance for displaying the status of various functions and for error display. For instance, defective gripper elements or other information can also be displayed visually in the gripper system.

Advantageously, the gripper elements are embodied as suction cups, magnets, mechanical grippers such as fingers or the like, or suction cushions, or form- and/or force-locking grippers. An adhesive or electrostatic connection is also conceivable. Suction cups, in particular, have the substantial advantage that not only two-dimensionally but also three-dimensionally curved, rigid or flexible bodies can be grasped equally well. Furthermore, gas-tight and porous bodies can be grasped. In addition, the suction cups can be optimally adapted in their shape to the workpiece or workpieces to be grasped.

A training mode is possible, in which the system can learn the position detection, part detection, and/or force detection, for instance by a linear ratchet in a snap-in operation, a collision, or adhesive bonding operations. The apparatus of the present invention, particularly because of its modular design, can be constructed quickly and reconfigured quickly and has high availability. The system is redundant with regard to the vacuum, the electrical system, and the pneumatic system.

A safety shutoff of the system is also possible, for instance if a predetermined force, such as a joining force, is exceeded, if a crash occurs, or if the wrong course of the force is ascertained. The safety shutoff can also be done, however, if the negative pressure drops, if some malfunction in the (CAN) bus occurs, or if there is a power failure.

Further advantages, characteristics and details of the present invention will become apparent from the dependent claims and the ensuing description, in which with reference to the drawing, particularly preferred exemplary embodiments of the invention are described in detail. The characteristics shown in the drawing and mentioned in the drawing and mentioned in the specification and recited in the claims can each be essential to the present invention individually or in arbitrary combination.

BRIEF DESCRIPTION OF THE DRAWINGS

FIG. 1, is a plan view of a first embodiment of the gripper system of the present invention;

FIG. 2, is a side view of the gripper system of FIG. 1;

FIG. 4, is a plan view on a further variant of the gripper system of the present invention;

FIG. 5, is a side view of the gripper system of FIG. 4;

DESCRIPTION OF THE PREFERRED EMBODIMENTS

Figure 3:
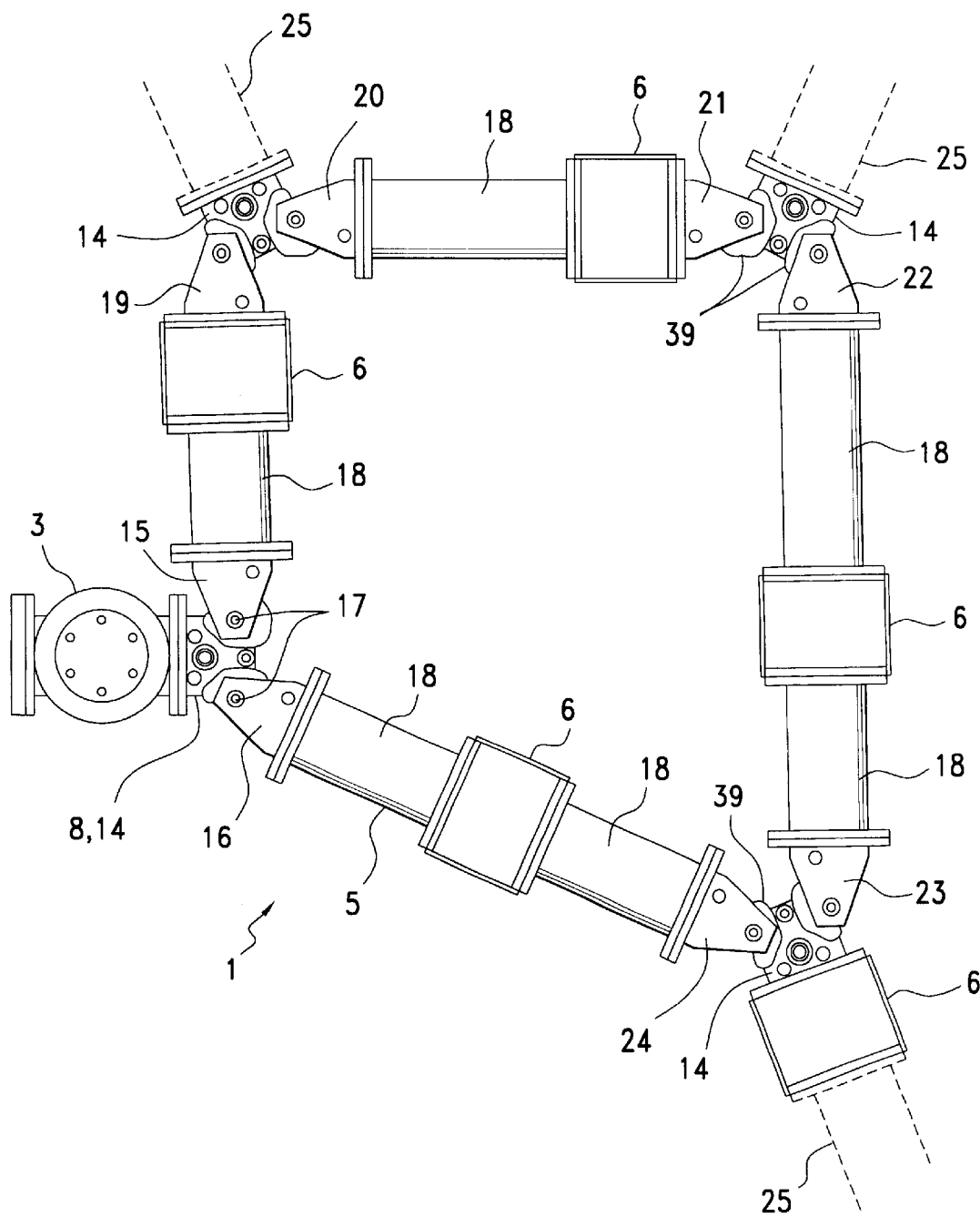
FIG. 3, is a plan view of a further embodiment of the gripper system of the present invention.

In FIG. 1, a first exemplary embodiment of a gripper system, identified overall by reference numeral 1, is shown. This exemplary embodiment of a gripper system 1 is embodied as a frame gripper 2. This frame gripper 2 has a robot flange 3, to which a robot arm can be secured. This robot flange is supported by two struts 4; the struts 4 are screwed to the frame, designated overall by reference numeral 5. This frame 5 comprises a plurality of components, and in the exemplary embodiment shown it has four gripper elements 6, four first connecting components 8 embodied as connecting pieces 7, and four second connecting components 8 embodied as corner pieces 9. There is also one electronics hookup 10 and one compressed-air hookup 11 on one corner piece 9. The gripper elements 6 and the connecting components 8 together form a rigid frame, which can be moved in space via the robot arm attached to the robot flange 3. The frame 5 can for instance be lowered onto generally flat workpieces 37 (FIG. 5) and placed on them so that via the suction cups 12, which are shown in more detail in FIG. 2, the workpiece 37 can be picked up by suction.

It can also be seen from FIG. 2 that the connecting components 8 laterally have a securing groove 13, with which other tools, such as cameras, welding devices, and so forth can be secured. FIG. 3 shows a further embodiment of the gripper system of the present invention, which again has a frame-like structure. The robot flange 3 is connected to a connecting component 8 embodied as a joint 14. This joint 14 has two articulated arms 15 and 16, which are pivotable in the X-Y plane, the plane of the drawing, about two pivot pins 17. Connected to the two articulated arms 15 and 16 are connecting pieces 18, which in turn are connected to gripper elements 6. The gripper element 6 associated with the articulated arm 15 is coupled to an articulated arm 19 of a further joint 14, whose second articulated arm 20 is connected via a further connecting piece 18 to a gripper element 6. This further gripper element 6 is connected in turn, via an articulated arm 21, to a third joint 14, whose second articulated arm 22 is connected, via a further connecting piece 18, to a fourth gripper element 6. This fourth gripper element 6, finally, is connected via a connecting piece 18 to an articulated arm 23 of a fourth joint 14, whose second articulated arm 24 is connected, via a connecting piece 18, to the gripper element 6 that is associated with the articulated arm 16 via a further connecting element 18.

This frame 5 shown in FIG. 3, in contrast to the exemplary embodiment of FIG. 1, is not rigid, since its configuration is adjustable by way of the location of the articulated arms 15, 16, 20–24 of the joints 14. The joints 14 can be adjusted manually or by motor. This gripper system 1 can be adapted to special shapes or configurations of workpieces 37. With this gripper system 1 and motor- adjustable components, it is accordingly possible for different workpieces, previously detected and recognized by means of a camera, for instance, to be grasped.

This gripper system 1 can also be expanded without problems; this is indicated particularly at the joints 14 by dot-dashed lines 25, where for example for the joint 14 that has the articulated arms 23 and 24, one further gripper element 6 is added. This makes this gripper system 1 variable in the X-Y plane.

FIGS. 4 and 5 show a further exemplary embodiment of a gripper system 1, in which once again a joint 14, which has articulated arms 26 and 27 that are pivotable in the X-Y plane of FIG. 4, is secured to the robot flange 3. Two connecting pieces 18 and 28 are connected to the articulated arms 26 and 27; the connecting piece 18 is connected to a gripper element 6, and the connecting piece 28 is connected to a swivel joint 29. Further gripper elements are connected both to this swivel joint 29 and to the robot flange 3. The free ends of the gripper elements 6 are terminated via end pieces 30 or adapter plates 31. It can be seen clearly from FIG. 5 that the swivel joint 29 has two articulated arms 32 and 33, which are pivotable in the direction of the arrow 34, or in other words in the direction of the longitudinal axis of the connecting piece 28 and the Z plane. In this way, the arm 35 of the gripper system 1 can be pivoted in such a way that the gripper element 6 connected to the articulated arm 33 can be placed against a beveled portion 36 of an otherwise flat workpiece 37. This gripper system is variable in space.

Figure 6:
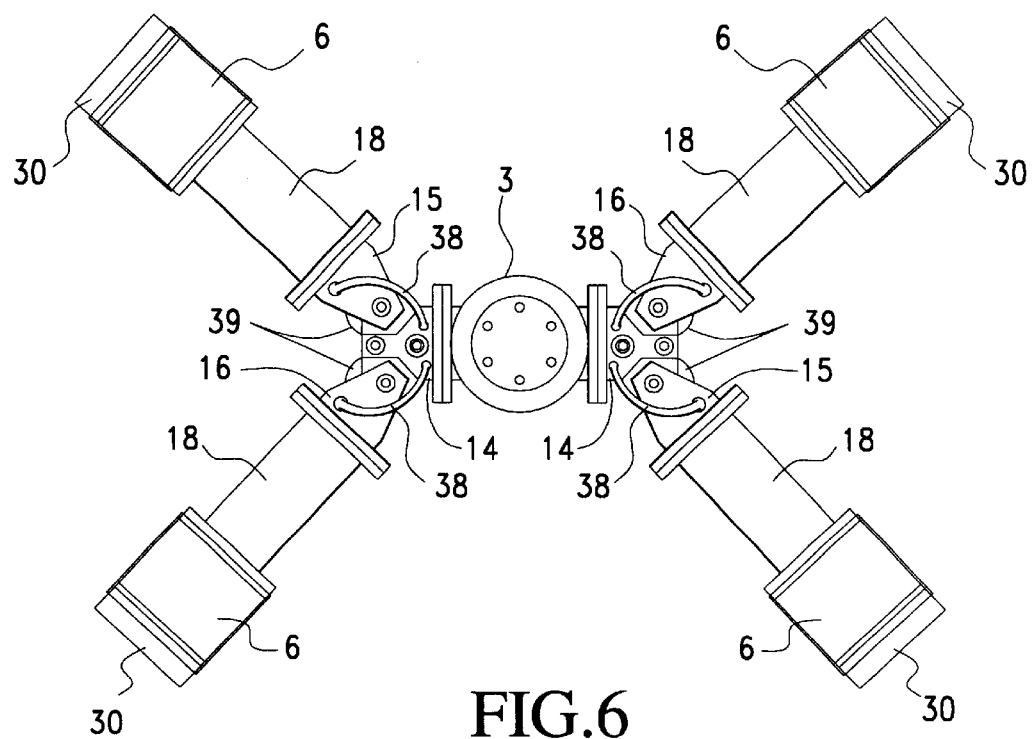
FIG. 6, is a further embodiment of the gripper system of the present invention.

In addition to the gripper system 1 shown in FIGS. 1 and 5 and embodied as a three-finger gripper, this system can also be designed as a four-finger gripper, which is shown in FIG. 6. Two joints 14 are connected to the robot flange 3, and one connecting piece 18, one gripper element 6 and one end piece 30 are secured to each of their articulated arms 15 and 16. The joints 14 have supply lines 38 for compressed air and lines 39 for transmitting both data and electrical energy to the gripper arms 15, 16, 19–24, 26 and 27 (FIG. 3).

Figure 7:
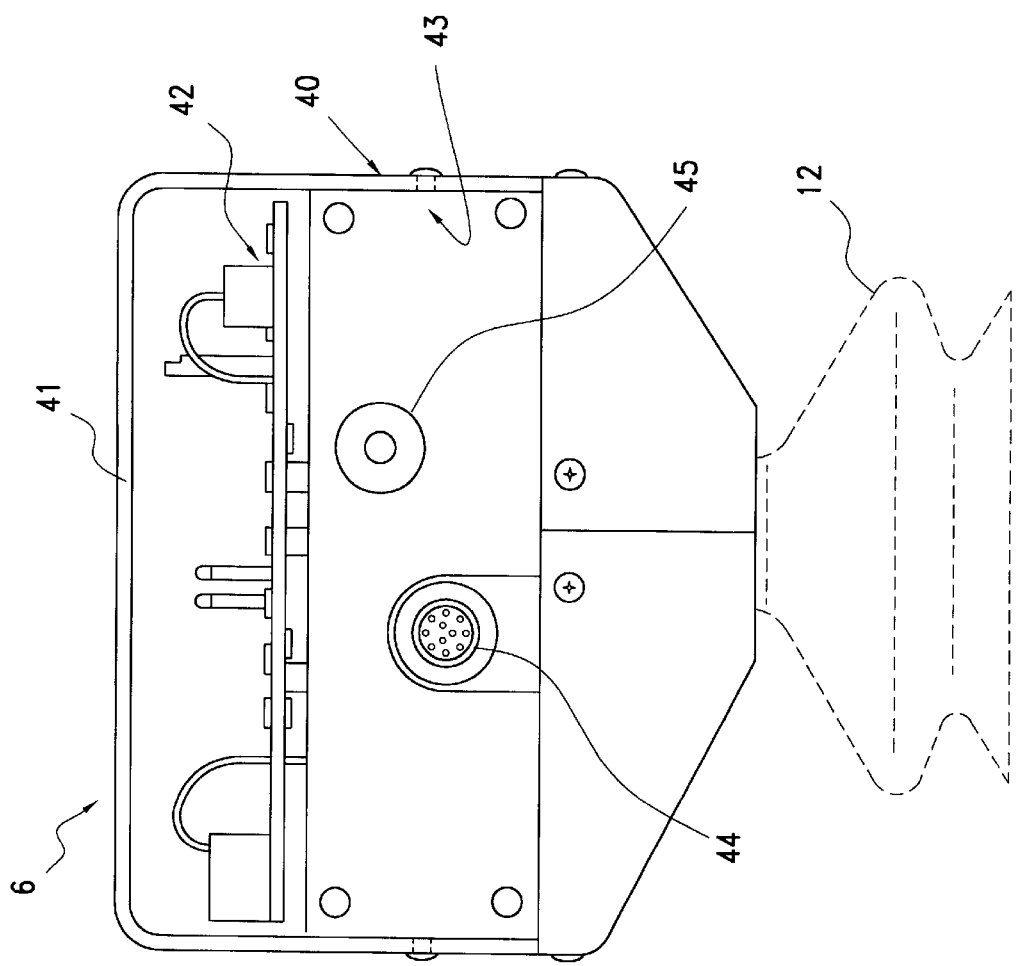
FIG. 7, is a side view of a gripper element.
Figure 10:
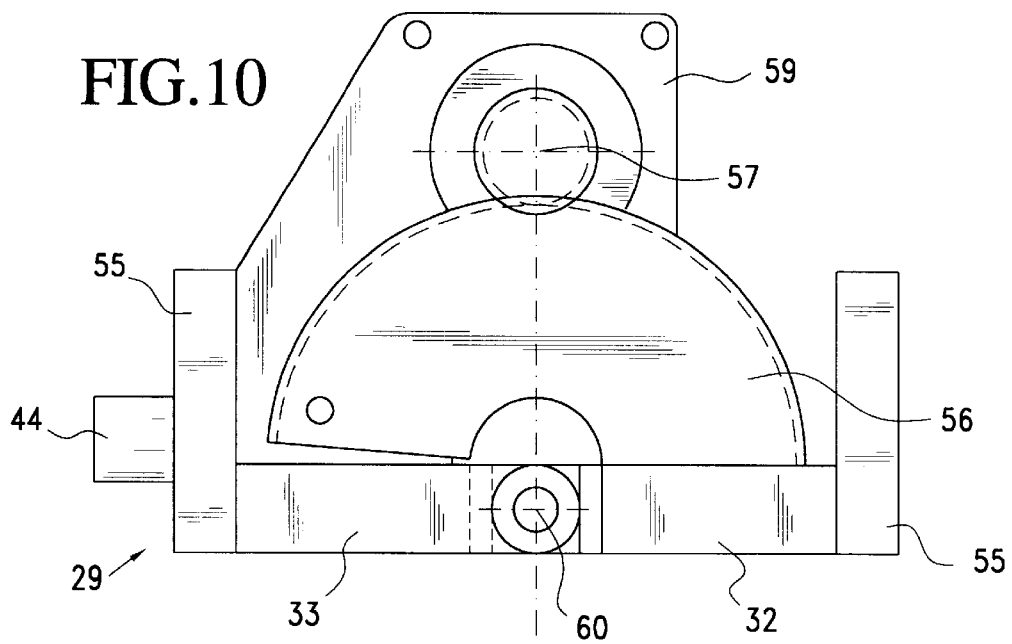
FIG. 10, is a side view of the joint of FIG. 9.

FIG. 7 shows a gripper element in side view. This gripper element 6 has a housing 40, which in particular has a transparent housing cover 41 fitted over it. Through the housing cover 41, electronic components 42, such as LEDs for monitoring the function and status, can be seen. These electronic components 42 form, among other elements, a microcontroller for computation tasks and a data memory.

Located on one side face 43 of the gripper element 6 is a plug connector 44 and an opening 45 into which a sealing ring can be inserted and which serves to deliver compressed air. On the side of the gripper element 6 opposite the side face 43, there is a socket 61 (FIG. 9) complimentary to the plug connector 44, as well as an opening that fits the opening 45, so that by simply inserting them into one another the individual components can be connected to one another. The plug connector 44 provides electrical connection of all the electrical or electronic components; by way of it, data can be exchanged and the components can be supplied with energy. The suction cup 12 is located on the underside of the gripper element 6.

Figure 8:
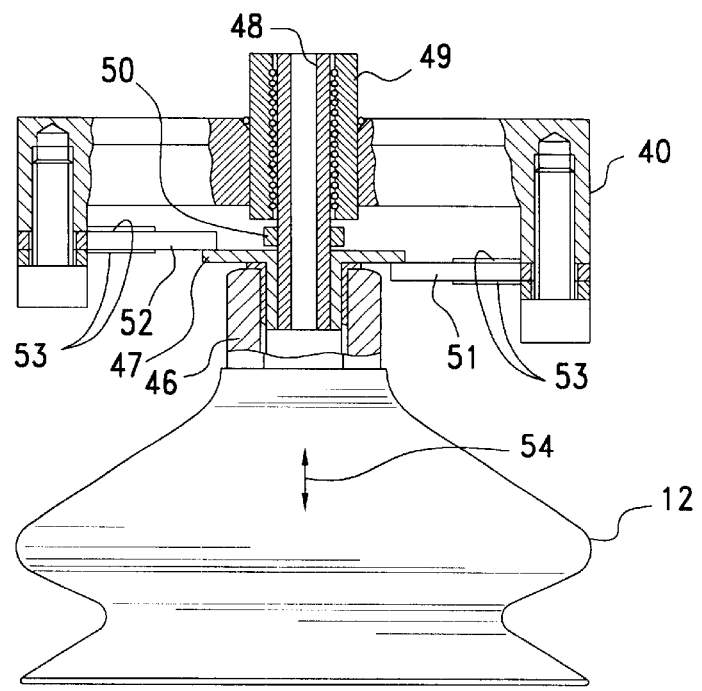
FIG. 8, is partly in section, the support of a suction cup of a gripper element.

The suction cup 12, as shown in FIG. 8, has a threaded connector 46, which is secured to an elastic suction bell and into which a threaded disk 47 is screwed. A shaft 48, which is guided without play in a ball bushing 49, is glued into this threaded disk 47. Slide bearings are also conceivable instead of the ball bushing 49. A V-ring 50 is seated on the shaft 48, and the shaft 48 is supported on the end face of the ball bush 49 via this ring. Two arms 51 and 52 are also provided, which are stationary on the housing 40 and extend in the direction of the threaded disk 47 and extend over it slightly at the edge. The arm 51 contacts the underside of the threaded disk 47, and the arm 52 contacts its top. Strain gauges 53, which detect any deformation of the arms 51 and 52, are disposed on both sides of each of the arms 51 and 52. Thus if the suction cup 52 is moved in the direction of the double arrow 54, then the arms 51 and 52 are deformed by the threaded disk 47, which is recorded via the strain gauges 53. In this way, forces in the receiving direction can be detected. Forces in other directions are supported by the ball bush 49.

Figure 9:
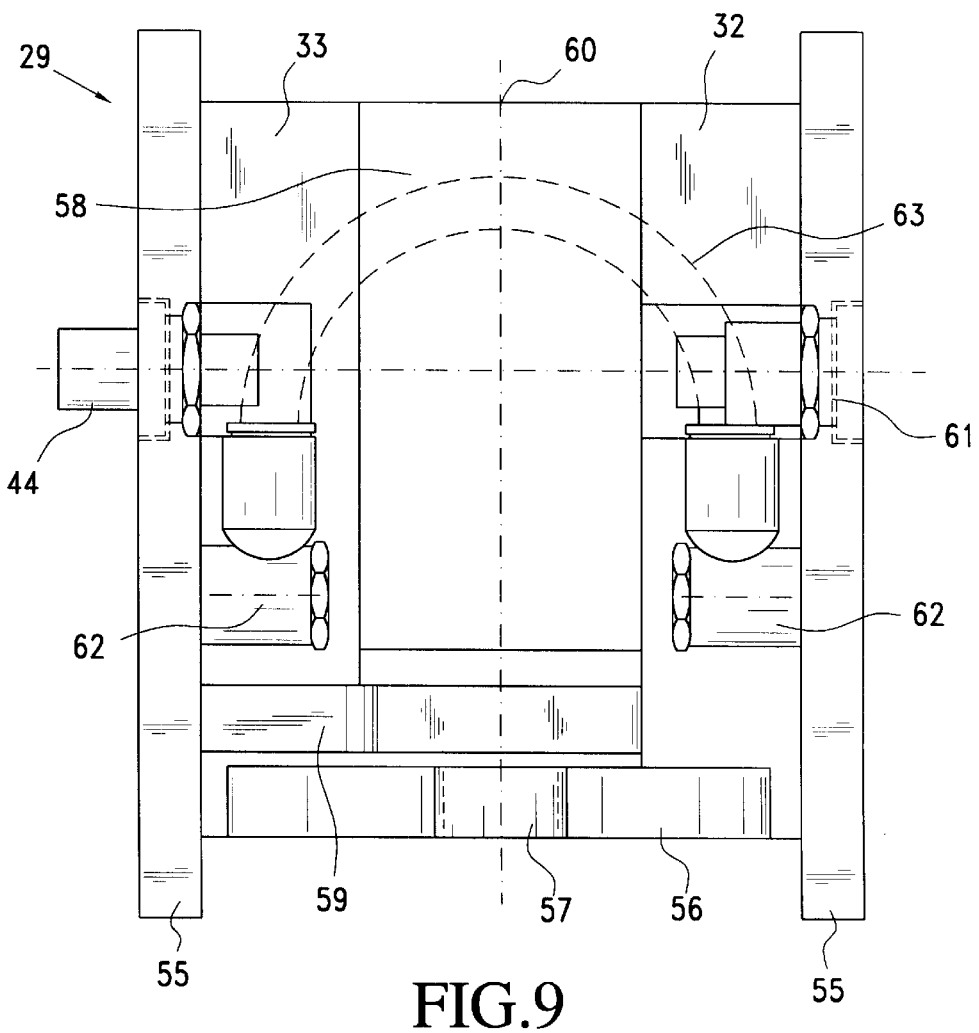
FIG. 9, is a plan view of a connecting component embodied as a joint.

FIG. 9 shows the swivel joint 29, which has already been mentioned in conjunction with FIGS. 4 and 5. This swivel joint 29 has two articulated arms 32 and 33, which are each provided with a respective flange plate 55. The plug connector 44 can be seen on one flange plate. The articulated arm 32 is provided with a gear wheel segment 56, which meshes with a pinion 57 of a drive motor 58 (stepping motor). This drive motor 58 is secured to a motor flange 59, and the motor flange 59 is connected to the articulated arm 33. By actuation of the drive motor 58, the position of the articulated arms 32 and 33 relative to one another can be varied; that is, the two articulated arms 32 and 33 can be pivoted about the pivot pin 60. In FIG. 9, the socket 61 for receiving a plug connector of an adjacent component can also be seen; this plug connector has the same construction as the plug connector 44. Threaded swivel connections 62 and a compressed-air line 63 can also be seen; the threaded swivel connections 62 open out into the openings 45.

Figure 12:
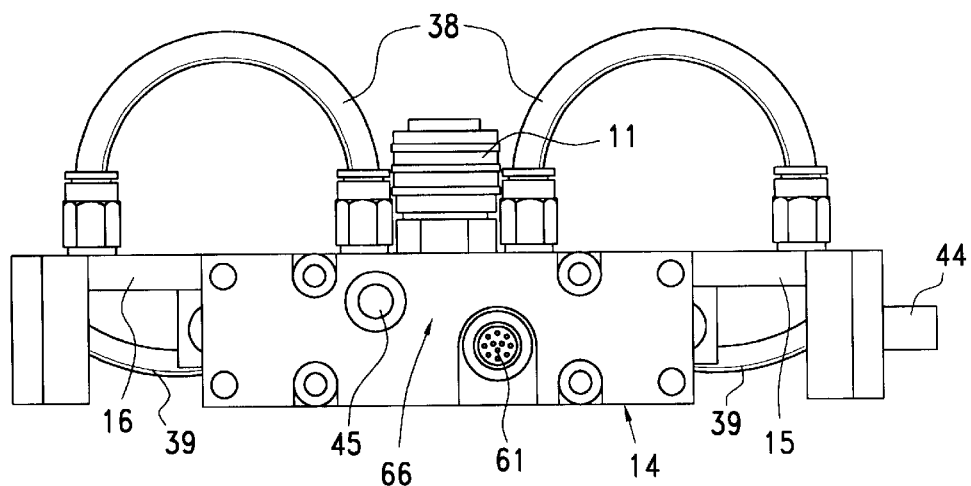
FIG. 12, is a side view of the joint of FIG. 11.
Figure 11:
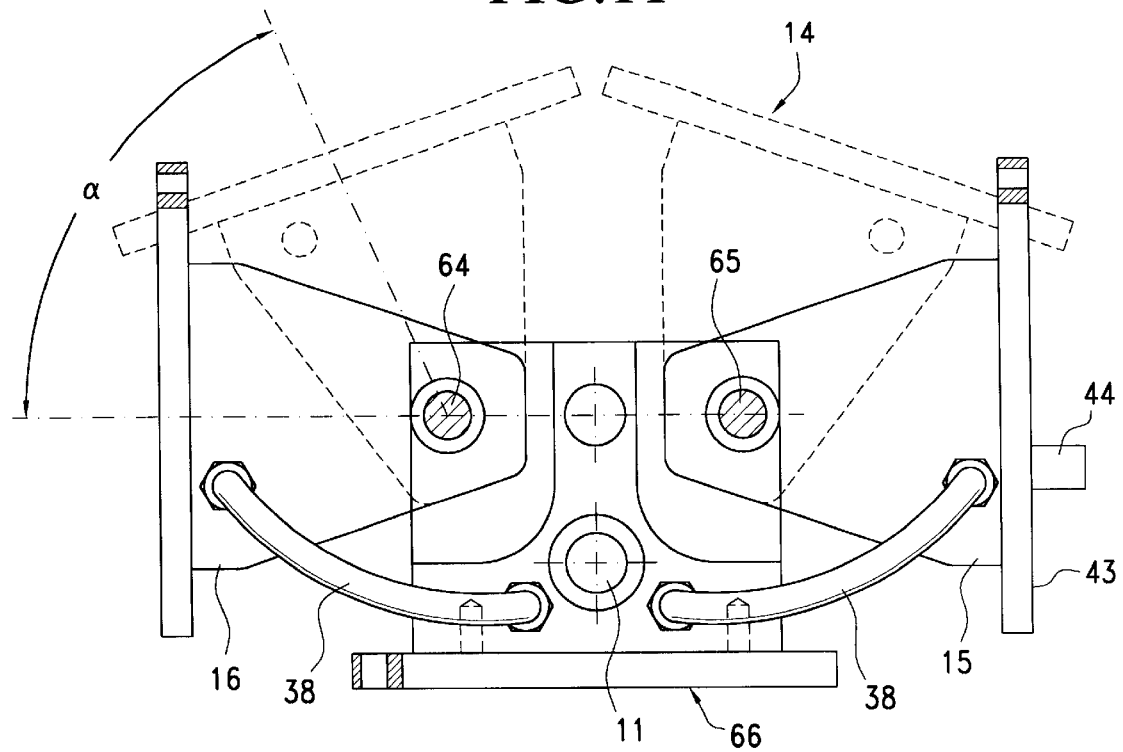
FIG. 11, is a plan view of a second embodiment of a connecting component embodied as a joint.

FIGS. 11 and 12 show the joint 14 with its articulated arms 15 and 16 both extended straight out and in a position pivoted by an angle α. The two articulated arms are pivotable about pivot pins 64 and 65. The face end 66 shown in FIG. 12 has the connection socket 61 for the electrical connection with a plug connector 44 and also has the opening 45 for the compressed-air hookup. A compressed-air hookup 11 for attaching a compressed-air supply hose is also provided on the top side of the joint 14. However, the joint 14 may also be provided with a flange, which has a side face 43 and thus has the connections 44 and 45. The joint 14 and the swivel joint 29 are self-locking and can also have an incremental encoder or rotary transducer, for instance, for measuring angles. As the joints, purely manually adjustable units are also conceivable.

The drawing shows merely exemplary embodiments of the gripper system 1 of the present invention; the present invention is not intended to be limited to the combinations shown in the drawing, and on the contrary, all combinations of these components are intended to be encompassed by the present invention. By permanently monitoring the force of gravity, the manipulation force and the joining force, errors and tendencies to error can be detected immediately. It is also possible to keep uninterrupted records and to monitor the manual manipulation. A further advantage is that the forces can be monitored not only when the workpiece is being grasped but also when it is being joined, which particularly when components are adhesively bonded is important in terms of clamping forces and clamping times.

What is claimed is:

1. A vacuum gripper system for grasping a workpiece, comprising:

a first vacuum gripper element for grasping the workpiece;

at least a second vacuum gripper element for grasping the workpiece, said at least a second vacuum gripper element being spaced apart from said first vacuum gripper element;

a first force sensor provided in the first vacuum gripper element for determining a force acting on the first vacuum gripper element in a first predetermined direction;

a second force sensor provided in said at least a second vacuum gripper element for determining a force acting on said at least a second vacuum gripper element in a second predetermined direction; and calculation means to which said first force sensor and said second force sensor are connected for determining from the forces determined whether the workpiece is grasped correctly or not.

2. The vacuum gripper system as defined in claim 1, wherein said first predetermined direction and said second predetermined direction each define a force receiving direction of an associated vacuum gripper element, and wherein each force sensor is disposed in such a way that a component of the force acting in the force respective receiving direction can be ascertained.

3. The gripper system as defined in claim 1, wherein each gripper element is embodied as a module, and wherein a plurality of gripper elements in excess of two are provided.

4. The vacuum gripper system as defined in claim 3, wherein said modules are plug-in modules.

5. The gripper system as defined in claim 1, further comprising: connecting components for connecting gripper elements together.

6. The vacuum gripper system as defined in claim 1, wherein said force sensors are strain gauges.

7. The vacuum gripper system as defined in claim 1, wherein said gripper elements are embodied as suction cups.

8. The vacuum gripper system as defined in claim 1, further comprising:

securing means for securing the system to the hand of a robot.

* * * * *